(12) United States Patent
Sinha et al.

(10) Patent No.: US 9,830,736 B2
(45) Date of Patent: Nov. 28, 2017

(54) SEGMENTING OBJECTS IN MULTIMEDIA DATA

(71) Applicant: Tata Consultancy Services Limited, Mumbai, Maharashtra (IN)

(72) Inventors: Aniruddha Sinha, Kolkata (IN); Tanushyam Chattopadhyay, Kolkata (IN); Sangheeta Roy, Kolkata (IN); Apurbaa Mallik, Kolkata (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 205 days.

(21) Appl. No.: 14/767,161

(22) PCT Filed: Jan. 22, 2014

(86) PCT No.: PCT/IN2014/000043
§ 371 (c)(1),
(2) Date: Aug. 11, 2015

(87) PCT Pub. No.: WO2014/125502
PCT Pub. Date: Aug. 21, 2014

(65) Prior Publication Data
US 2016/0035124 A1    Feb. 4, 2016

(30) Foreign Application Priority Data

Feb. 18, 2013   (IN) .......................... 470/MUM/2013

(51) Int. Cl.
*G06T 15/08*  (2011.01)
*G06T 7/20*  (2017.01)
(Continued)

(52) U.S. Cl.
CPC ............. *G06T 15/08* (2013.01); *G06T 7/11* (2017.01); *G06T 7/187* (2017.01); *G06T 7/20* (2013.01);
(Continued)

(58) Field of Classification Search
None
See application file for complete search history.

(56) References Cited

U.S. PATENT DOCUMENTS 6,625,310 B2   9/2003  Lipton et al.
6,867,774 B1   3/2005  Halmshaw et al.
(Continued)

FOREIGN PATENT DOCUMENTS

WO   2005072239 A2   8/2005

OTHER PUBLICATIONS

Hao Zhang and Lynne E. Parker, "4-Dimensional Local Spatio-Temporal Features for Human Activity Recognition" Proc. of IEEE International Conference on Intelligent Robots and Systems, San Francisco, CA, 2011, dated 2011 (6 pages).
(Continued)

*Primary Examiner* — Said Broome
(74) *Attorney, Agent, or Firm* — Shumaker, Loop & Kendrick, LLP

(57) ABSTRACT

Disclosed is a method for segmenting a plurality of objects from a two-dimensional (2D) video captured through a depth camera and an RGB/G camera. The method comprises detecting camera motion in each 2D frame of the plurality of 2D frames from the 2D video and generate a first set of 2D frames without any camera motion. The method further comprises generating a plurality of cloud points for the first set of 2D frames corresponding to each pixel associated a 2D frames in the first set of 2D frames. The method further comprises generating a 3D grid comprising a plurality of voxels. The method further comprises determining valid voxels and an invalid voxels in the 3D grid. Further, a 3D connected component labeling technique is applied on to the set of valid voxels to segment the plurality of objects in the 2D video.

13 Claims, 7 Drawing Sheets

(51) Int. Cl.
- *G06T 7/50* (2017.01)
- *G06T 7/11* (2017.01)
- *G06T 7/187* (2017.01)

(52) U.S. Cl.
CPC ...... *G06T 7/50* (2017.01); *G06T 2207/10016* (2013.01); *G06T 2207/10024* (2013.01); *G06T 2207/10028* (2013.01); *G06T 2207/30196* (2013.01); *G06T 2207/30232* (2013.01)

(56) References Cited

U.S. PATENT DOCUMENTS

| | | |
|---|---|---|
| 7,274,810 B2 | 9/2007 | Reeves et al. |
| 8,194,093 B2 * | 6/2012 | Perlman ............ G06K 9/00255 |
| | | 345/420 |
| 8,202,220 B2 | 6/2012 | Murashita |
| 8,249,316 B2 | 8/2012 | Hu et al. |
| 8,249,687 B2 | 8/2012 | Peterson et al. |
| 8,401,225 B2 | 3/2013 | Newcombe et al. |
| 8,564,534 B2 | 10/2013 | Leyvand et al. |
| 2006/0276708 A1 | 12/2006 | Peterson et al. |
| 2009/0024029 A1 | 1/2009 | Murashita |
| 2011/0080336 A1 | 4/2011 | Leyvand et al. |
| 2011/0293137 A1 * | 12/2011 | Gurman ............. G06K 9/00201 |
| | | 382/103 |
| 2012/0194516 A1 * | 8/2012 | Newcombe ............. G06T 17/00 |
| | | 345/420 |

OTHER PUBLICATIONS

Sojan Lal P., "Some Efficient Representations of 3D Information Based on Octrees", a Thesis, dated Dec. 29, 2000 (113 pages).

Gunilla Borgefors, Ingela Nystrom, Gabriella Sanniti Di Baja, "Computing skeletons in three dimensions", Pattern Recognition 32 (1999) 1225-1236 (12 pages).

Annie Yao and Andrew Calway, "Dense 3-D Structure from Image Sequences Using Probabilistic Depth Carving", Department of Computer Science University of Bristol, UK, 2003, Retrieved date Jul. 28, 2015 (10 pages).

International Search Report for PCT/IN2014/000043, dated Jan. 21, 2015 (2 pages).

* cited by examiner

SEGMENTING OBJECTS IN MULTIMEDIA DATA

CROSS REFERENCE TO RELATED APPLICATIONS

This is a 35 U.S.C. §371 U.S. National Stage filing claiming priority from to PCT/IN2014/000043 filed Jan. 22, 2014, which claims priority from Indian Patent Application No. 470/MUM/2013 filed on Feb. 18, 2013, each Application being incorporated by reference in its entirety.

TECHNICAL FIELD

The present subject matter described herein, in general, relates to object segmentation, and more particularly to object segmentation in multimedia data such as, videos and images.

BACKGROUND

Developments in field of multimedia processing, such as image processing and video processing have led to a tremendous growth in a field of interactive three dimensional (3D) virtual environments. The 3D virtual environments have applications in fields of virtual games, medical surgeries, autonomous robotics, and video surveillance. Video surveillance may be performed using certain video surveillance systems. The video surveillance systems capture videos in real time using multiple cameras and process the videos to detect human activities at various locations such as, party get-together, street movement, threat detection and criminal activities such as, kidnapping, robbery, riots and road accidents. Most of the video surveillance systems rely on manual detection of human activities using mere observational skills of a human. But with increase of number of surveillance cameras on streets and at other public places, a task of manually monitoring activities in each and every camera of the video surveillance system has becomes highly difficult. The video surveillance system in an office, market, and university require robust recognition method to perform precisely and in an automated manner. In today's world, automatic recognition of activities and gestures in video is vital for video surveillance applications.

In the era of digital technology, emphasis has been growing on automatic detection of objects in images and videos. In order to detect objects in images and videos, a number of image processing techniques are known. The image processing techniques for object detection in a video starts with segmenting individual objects in each frame of the video. As each frame is depicted in a two dimensional plane, it is difficult to segment connected or overlapping objects in the frame since depth information associated therewith each object is unavailable. Since the depth information is generally unavailable, segmentation of objects is solely based upon color data of the pixels in each frame. Further, the segmentation of objects in 2D images largely depends upon resolution of the video captured.

Due to frequent changing parameters such as, luminance and motion of the surveillance cameras, it becomes unreliable to use such image processing techniques for segmenting objects. Considering the increasing number of surveillance cameras, the amount of raw information accumulated in the form of a live streamed video from the surveillance cameras is very high. These live streamed videos need to be processed in real-time in order to generate relevant alerts and detect different human activities. The main challenge remains with segmenting of individual overlapping components which requires a lot of processing.

SUMMARY

This summary is provided to introduce concepts related to systems and methods for segmenting a plurality of objects present in a two-dimensional (2D) video and the corresponding depth frames having a plurality of 2D frames and depth frames and the concepts are further described below in the detailed description. This summary is not intended to identify essential features of the claimed subject matter nor is it intended for use in determining or limiting the scope of the claimed subject matter.

In one implementation, a segmentation system for segmenting a plurality of objects present in a two-dimensional (2D) video having a plurality of 2D frames and the corresponding depth frames. For the purpose of present subject matter, it may be understood that each 2D frame comprises Red-Green-Blue/Gray (RGB/G) data and depth data for each pixel present in each 2D frame. Therefore, the 2D frame may be interchangeably used as RGB/G frame in the present subject matter. Similarly, the 2D video may also be interchangeably used as RGB/G video in the present subject matter.

The segmentation system further comprises of a processor and a memory coupled to the processor for executing a plurality of modules present in the memory. The plurality of modules comprises a detection module, a cloud point module, a voxelization module and a voxel labeling module. The detection module is configured to detect camera motion in each RGB/G frame which is a subset of the 2D video and accordingly classify the 2D video into a first set of 2D frames and a second set of 2D frames. The first set of 2D frames is detected to be void of the camera motion, whereas the second set of 2D frames is detected to have the camera motion therein. Further, the cloud point module is configured to generate a plurality of cloud points corresponding to each pixel in each 2D frame of the first set of 2D frames. The cloud point stores the x, y, z co-ordinates and color data associated with each pixel of each 2D frame of the first set of 2D frames. The x, y, z co-ordinates are derived from the depth data and the camera intrinsic and extrinsic parameters. On the other hand, the voxelization module is configured to generate a 3D grid comprising a plurality of voxels, wherein each voxel has a fixed volume in the 3D grid. Further, each voxel accommodates one or more cloud points. The 3D grid is indicative of a division of a 3D space by a plurality of equidistant planes perpendicular to an x-axis, a y-axis and a z-axis. The 3D space is associated with each 2D frame from the first set of 2D frames. Each voxel in the 3D grid is indicative of a cell with the fixed volume surrounded by three pairs of consecutive equidistant planes along the x-axis, y-axis and z-axis. The voxelization module is further configured to count the number of cloud point in each voxel and accordingly classify the voxels in each 3D grid as a valid voxels and an invalid voxels using a cloud point threshold. Accordingly all the voxels corresponding to each and every 2D frame from the first set of 2D frames are classified into a first set of voxels and a second set of voxels by the voxelization module, wherein the first set of voxels are valid voxels, and wherein the second set of voxels are invalid voxels. Further, a 3D connected component labeling technique is applied on to the set of valid voxels by the voxel labeling module in order to segment the plurality of objects present in the first set of 2D frames.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to refer like features and components.

DETAILED DESCRIPTION

Figure 1:
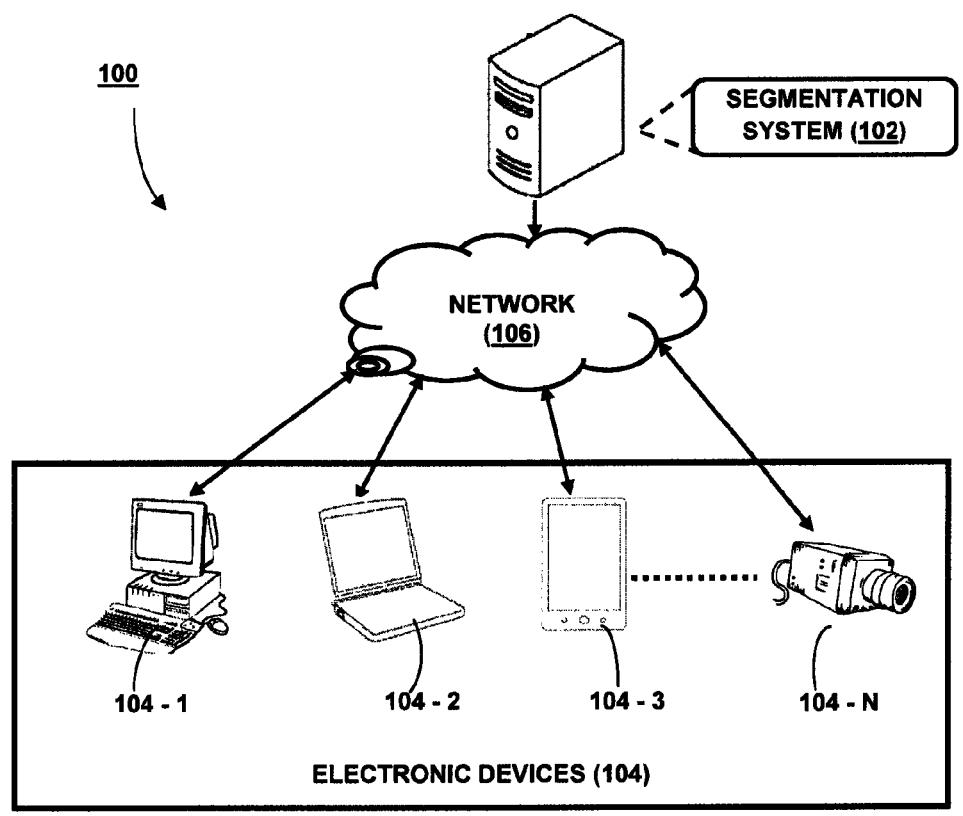
FIG. 1 illustrates a network implementation of a segmentation system for segmenting a plurality of objects in a 2D video along with the depth data, in accordance with an embodiment of the present subject matter.

Systems and methods for dynamically processing, in real time, multimedia data such as, a two-dimensional (2D) video along with depth information for segmenting a plurality of objects in the 2D video are described. The present subject matter discloses an effective and efficient mechanism for segmenting components, hereinafter interchangeably referred to as objects, in the 2D video using temporal characteristics such as, depth data and color data associated with the 2D video.

In one implementation, at first, camera motion is detected in each 2D frame of a plurality of 2D frames of the 2D video captured using a camera. The camera motion may be detected by monitoring a change in color intensity of pixels over a sequence of 2D frames of the 2D video. The change in color intensity assists in identifying 2D frames with disturbances such as, camera motion and illumination changes. The plurality of 2D frames are segregated into a first set of 2D frames and a second set of 2D frames, based upon the detection of the camera motion in each frame. The first set of 2D frames is detected to be void of the camera motion, whereas the second set of 2D frames is detected to have the camera motion therein. It, is to be understood that the second set of 2D frames are discarded due to the presence of disturbance or camera motion therein.

Therefore, it may be understood that in order to detect disturbance/camera motion in the 2D video, at first, all the 2D frames in the 2D video are observed sequentially to detect frequent illumination changes. If the deviation in the intensity at each pixel is more than a predetermined intensity threshold in a predetermined time interval, it is assumed that there has been some disturbance in said predetermined time interval. Accordingly all the 2D frames in the predetermined time interval are discarded hereafter the discarded 2D frames are referred as a second set of 2D frames. The rest of the 2D frames from the 2D video are considered as 2D frames without disturbances and further processing is done accordingly on the 2D frames having no disturbance hereinafter referred to as the first set of 2D frames.

After segregating the 2D frames into the first set of 2D frames and the second set of 2D frames, a plurality of cloud points are determined corresponding to each pixel in the 2D frames present in the first set of 2D frames. Wherein, the cloud points are representative of a smallest entity in a 3D space, wherein the cloud point is equivalent to a pixel in a 2D frame. The cloud points comprise depth data and color data for each pixel of each 2D frame present in the first set of 2D frames. Subsequent to the determination of cloud points, a voxelization technique is applied on each 2D frame of the first set of 2D frames. In the voxelization technique, each 2D frame along with the depth data of the first set of 2D frames is converted into a 3D grid. The 3D grid is indicative of a division of a 3D space associated with each of the 2D frames by a plurality of equidistant planes perpendicular to an x-axis, a y-axis and a z-axis. Further, 3D comprises a plurality of voxels. Each voxel has a definite volume in the 3D grid. Further, each voxel accommodates one or more cloud points. Furthermore, each voxel being indicative of the definite volume is surrounded by three pairs of consecutive planes along the x-axis, the y-axis and the z-axis of 3D Cartesian Coordinates System.

It may be understood that the voxelization technique is used to reduce noise from the first set of 2D frames. The noise may be in the form of a plurality of misplaced cloud points, wherein the misplaced cloud points need to be removed for proper segmentation. A noise reduction technique is applied on the 3D grid using a predetermined cloud point threshold and accordingly a set of valid voxels is identified.

After the set of valid voxels are identified, a labeling technique is applied on the set of valid voxels to label each voxel in the set of valid voxel using a plurality of labels. The plurality of labels facilitates segmentation of the objects present in the 2D video. The objects, after being segmented, may be used for a number of applications in a virtual environment such as, human activity detection in surveillance systems and gesture detection in virtual gaming.

While aspects of described system and method for segmentation of a plurality of overlapping or connected components/objects may be implemented in any number of different computing systems, environments, and/or configurations, the embodiments are described in the context of the following exemplary system.

Referring now to FIG. 1, a network implementation 100 of a segmentation system 102 for segmenting components/objects in a 2D video along with the depth data is illustrated, in accordance with an embodiment of the present subject matter. Example of objects may include human beings or any other living or non-living being. It may be understood that the objects may be overlapping, non-overlapping, connected, or unconnected with one another in the 2D video. In one embodiment, the segmentation system 102 provides for real time segmentation of the objects in the 2D video captured from a video surveillance system. In one embodiment, the 2D video may be captured using a camera capable capturing depth data and color data present in the 2D video. The objects present in the 2D video are segmented by the segmentation system 102 using techniques illustrated in detail in the explanation of FIG. 2.

Although the present subject matter is explained considering that the segmentation system 102 is implemented on a server, it may be understood that the segmentation system 102 may also be implemented in a variety of computing systems, such as a laptop computer, a desktop computer, a notebook, a workstation, a mainframe computer, a server, a network server, and the like for segmenting objects in the 2D video captured in real-time or, statically. Further, it may be understood that the segmentation system 102 may be accessed by multiple users through one or more electronic devices 104-1, 104-2, 104-3, and 104-N collectively referred to as electronic devices 104 hereinafter, or applications residing on the electronic devices 104. Examples of the electronic devices 104 may include, but are not limited to, a portable computer, a personal digital assistant, a handheld device, and a workstation. The electronic devices 104 are communicatively coupled to the segmentation system 102 through a network 106.

In one implementation, the network 106 may be a wireless network, a wired network or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

Figure 2:
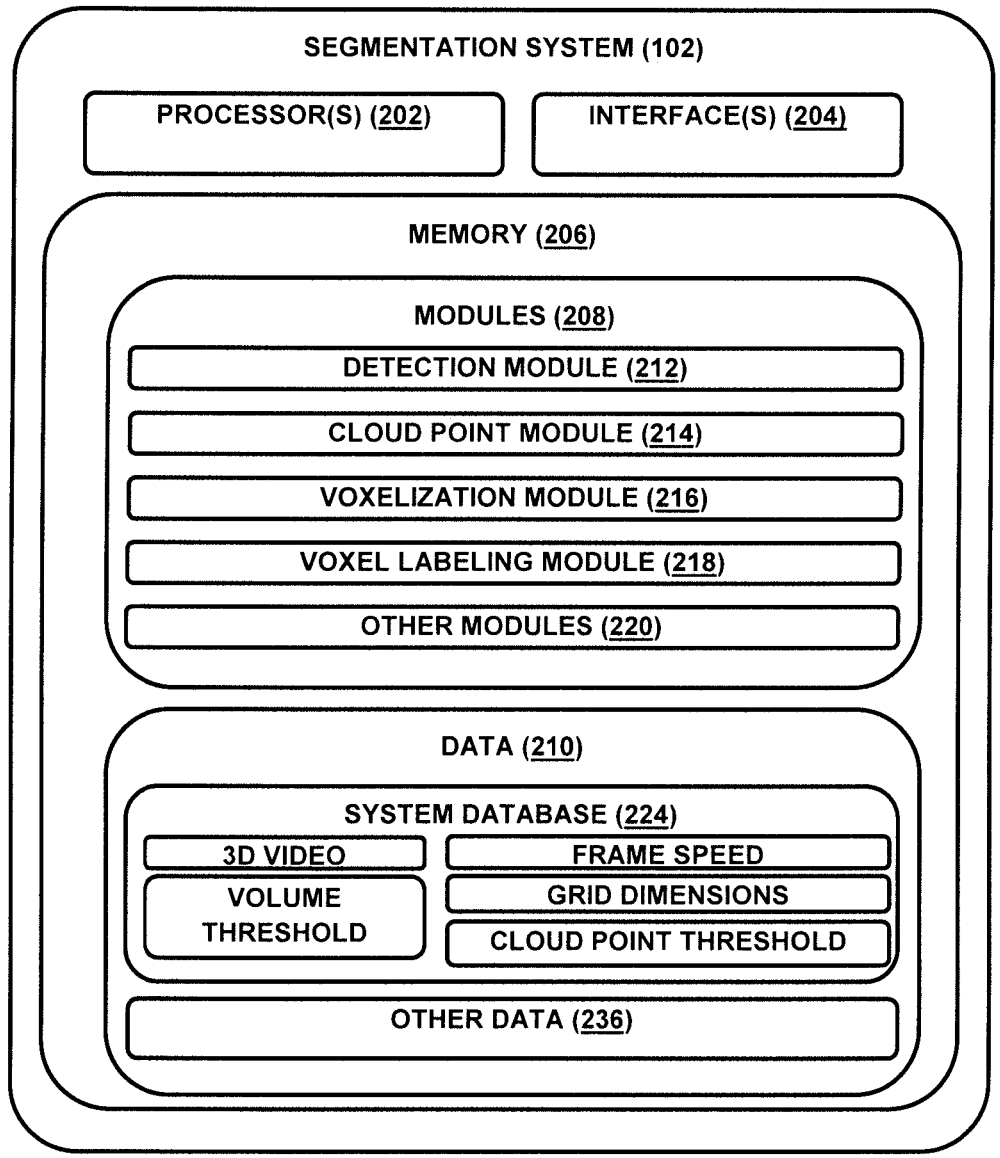
FIG. 2 illustrates components for the segmentation system, in accordance with an embodiment of the present subject matter.

Referring now to FIG. 2, the segmentation system 102 is illustrated in accordance with an embodiment of the present subject matter. In one embodiment, the segmentation system 102 may include at least one processor 202, an input/output (I/O) interface 204, and a memory 206. The at least one processor 202 may be implemented as one or more microprocessors, microcomputers, microcontrollers, digital signal processors, central processing units, state machines, logic circuitries, and/or any devices that manipulate digital signals based on operational instructions. Among other capabilities, the at least one processor 202 is configured to fetch and execute computer-readable instructions stored in the memory 206.

The I/O interface 204 may include a variety of software and hardware interfaces, for example, a web interface, a graphical user interface, and the like. The I/O interface 204 may allow the segmentation system 102 to interact with a user through the electronic devices 104. Further, the I/O interface 204 may enable the segmentation system 102 to communicate with other computing devices, such as web servers and external data servers (not shown). The I/O interface 204 can facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 206 may include modules 208 and data 210.

The modules 208 include routines, programs, objects, components, data structures and the like, which perform particular tasks or implement particular abstract data types. In one implementation, the modules 208 may include a detection module 212, a cloud point module 214, a voxelization module 216, a voxel labeling module 218 and other modules 220. The other modules 220 may include programs or coded instructions that supplement applications and functions of the segmentation system 102.

The data 210, amongst other things, serves as a repository for storing data processed, received or generated by one or more of the modules 208. The data 210 may also include a system database 224, and other data 236. The system database 224 stores a 2D video, a volume threshold, a frame speed, a grid dimension, and a cloud point threshold. The other data 236 may include data generated as a result of the execution of one or more modules in the other modules 220.

In one implementation, at first, a user may use the electronic device 104 to access the segmentation system 102 via the I/O interface 204. The users may register themselves using the I/O interface 204 in order to use the segmentation system 102. The segmentation system 102 may be used for dynamically monitoring and segmenting individual objects in the 2D video along with the depth data captured from a video surveillance system. In order to capture the 2D video, the video surveillance system may use a camera capable of capturing both the depth and the color data associated with the 2D video. The working of the segmentation system 102 may be explained in conjunction with FIGS. 3-6 explained below.

Figure 3:
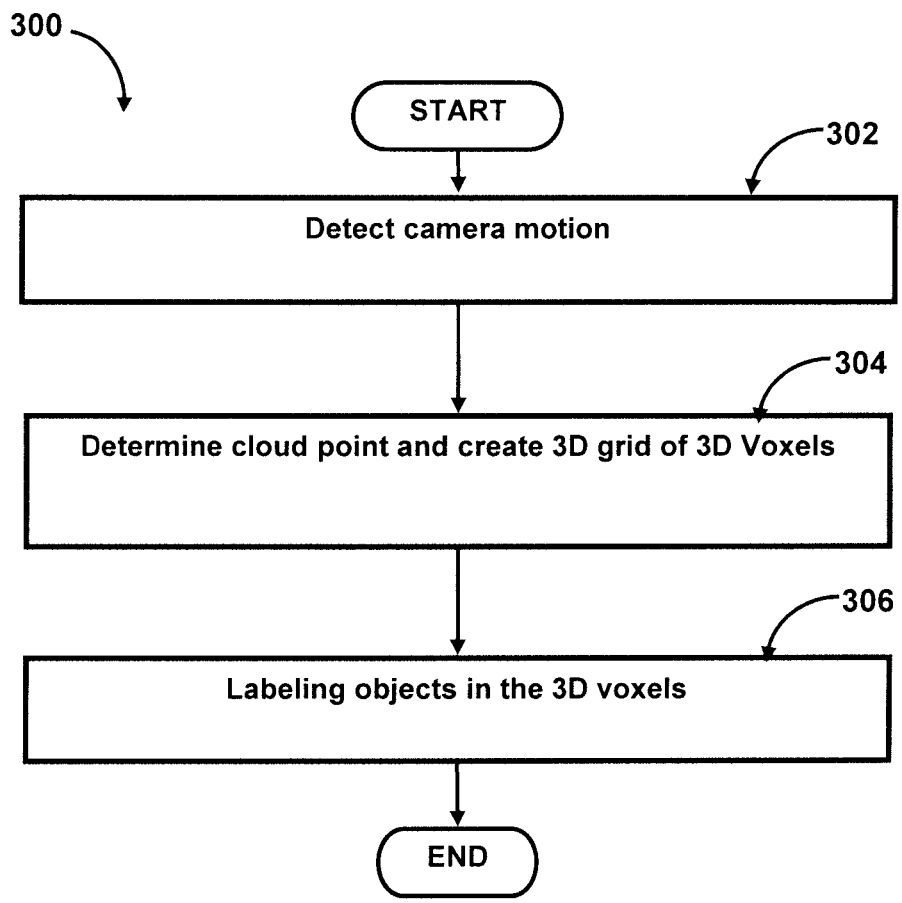
FIG. 3 is flowchart illustrating a method for segmenting a plurality of objects in a 2D video, in accordance with an embodiment of the present subject matter.

Referring to FIG. 3, working of the segmentation system (102) is disclosed, in accordance with an embodiment of the present subject matter. Specifically, in the present implementation, the working of the segmentation system may be explained in three blocks, namely, block 302, block 304, and block 306. At block 302, the detection module 212 receives the 2D video having a plurality of 2D frames. After receiving the 2D video, the detection module 212 detects camera motion in each 2D frame of the plurality of 2D frames of the 2D video. Camera motion may be understood as disturbances or illumination changes due to a movement in camera while capturing the 2D video. Accordingly all the frames are classified as first set of frames and second set of frames. The first set of 2D frames is indicative of 2D frames without camera motion and the second set of 2D frames is indicative of frames with camera motion.

At block 304, at first, the cloud point module 214 is used to generate a cloud point corresponding to each pixel in the 2D frame from the first set of 2D frames using a depth and a color data associated therewith. In the next step, the voxelization module (216) is used to convert a 3D space (Sc) associated with each of the 2D frame form the first set of 2D frames into a plurality of 3D voxels constituting a 3D grid. The 3D voxels are hereafter referred as "voxels". The voxelization module (216) further classifies each of the voxels into a valid voxel and an invalid voxel.

At block 306, all a connected components labeling technique is applied on the 3D space (Sc) associated with the first set of frames in order to segment the objects represented by the valid voxels into individual components/objects using a plurality of labels. It is to be understood that blocks 302 is further explained in detailed in FIG. 4, block 304 is further explained in FIG. 5, and block 306 is further explained in FIG. 6.

Figure 4:
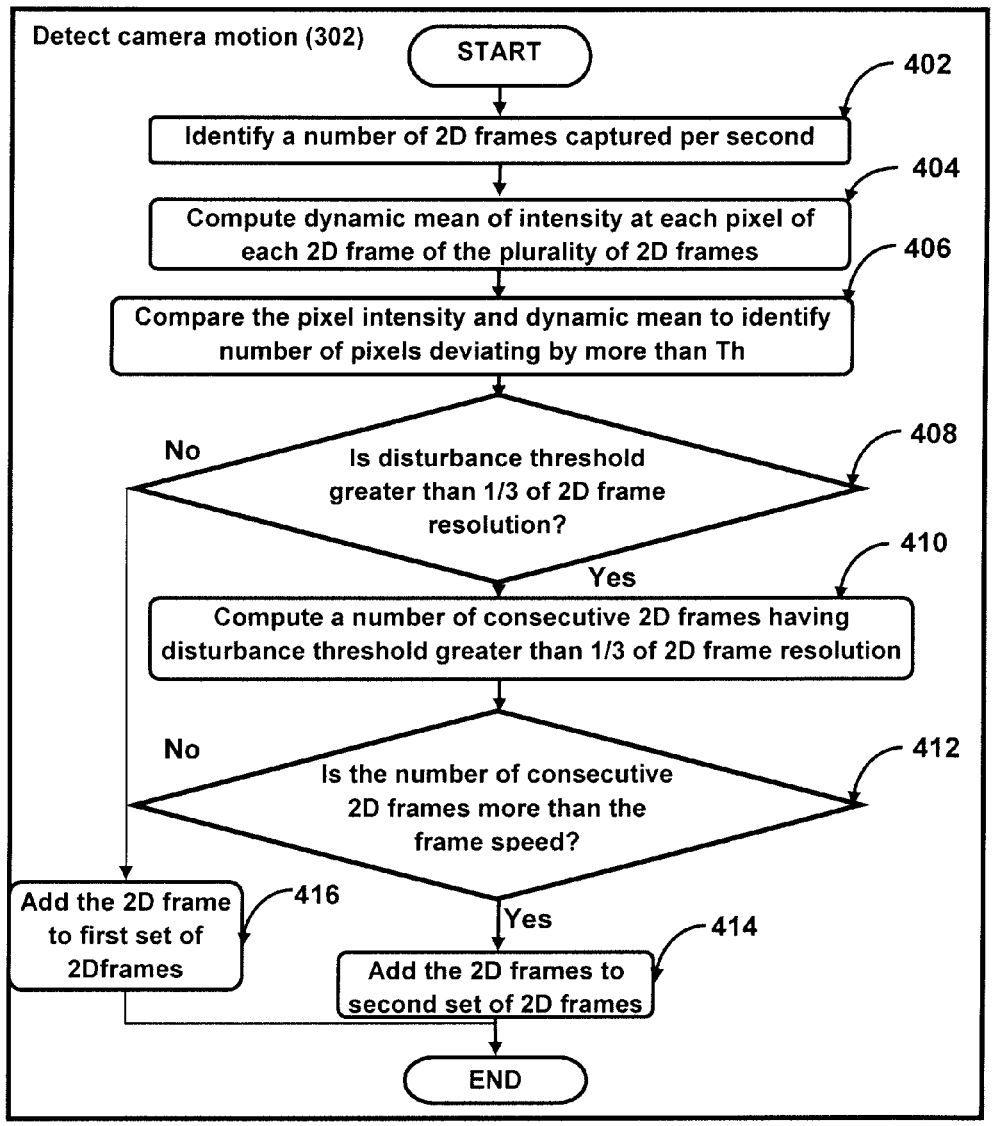
FIG. 4 is a flowchart illustrating a method for detecting camera motion, in accordance with an embodiment of the present subject matter.

Referring now to FIG. 4, detection of camera motion, as performed by the detection module 212, is explained using a flowchart, in accordance with an embodiment of the present subject matter. In one embodiment, the 2D video captured using a Kinect device is retrieved from one of the electronic devices 104 and stored into the system database 224 as the 2D video. The Kinect device captures the depth data associated with each 2D frame as well as color data in the RGB/G format associated with the 2D video and stores the depth and color data in a digital format in the system database 224.

At block 402, a process of detecting camera motion by the detection module 212 starts. Specifically, the detection module 212 analyzes the 2D video to identify a number of 2D frames displayed in one second. The number of 2D frames displayed in one second may be hereinafter referred to as frame speed. The frame speed may vary depending on the electronic device 104 or camera used to capture, the 2D video. Further, the frame speed may act as a predetermined time interval for discarding the 2D frames with camera motion therein.

At block 404, a dynamic mean $\mu n$ of intensity at each pixel each 2D frame of the plurality of 2D frames of the 2D video is computed using a following equation:

$$\mu n(i, j) = \mu^*(n-1) + p(i, j))/n,$$

where $p(i, j)$ is pixel intensity of $(i, j)^{th}$ location; and where i=height, j=width of the frame; and n=1, 2, to n, wherein n indicates a number of 2D frames in the 2D video. In a similar manner, at block 404, the dynamic mean of intensity is computed for each pixel of each 2D frame of the plurality of 2D frames in the 2D video. It may be understood that the each 2D frame of the plurality of 2D frames is a 2D frame.

Subsequently, at block 406, the detection module 212 computes a difference of intensity between the pixel intensity $p(i,j)$ and dynamic mean intensity $\mu n(i,j)$ for each pixel of each 2D frame of the plurality of 2D frames of the 2D video. In one example, the difference in the intensity at each pixel is further compared with threshold value of Th.

In one example, the Th is assigned a value of 16 units. If the difference in the intensity at each pixel is more than 16 units, it may be asserted that there is camera motion or a major disturbance in that pixel in that particular frame. Accordingly, a total number of pixels with more than Th i.e. 16 units of difference in intensity is computed for each 2D frame and stored as a disturbance threshold. For example, if a 2D frame X has a total number of $10^7$ pixels, and out of those, $10^4$ pixels have more than Th i.e. 16 units of difference in intensity, then the disturbance threshold for the 2D frame X will be $10^4$.

At block 408, the disturbance threshold of each 2D frame is compared with a resolution of the frame. In case, the disturbance threshold is more than one third of the resolution of the frame, then that 2D frame may be considered to have camera motion or disturbance. However, if the disturbance threshold is less than one third of the resolution of the frame, then that 2D frame may be considered to be void of camera motion and may be added to the first set of 2D frames at block 416. In other words, the first set of 2D frames includes 2D frames that were captured while the camera was still. Similarly, camera motion may be detected in each 2D frame of the plurality of 2D frames.

At block 410, the detection module 212 computes a number of consecutive 2D frames having disturbance threshold greater than ⅓ of the 2D frame resolution. Subsequently, at block 412, the detection module 212 determines whether the number of consecutive 2D frames, having disturbance threshold greater than ⅓ of the 2D frame resolution, is more than the frame speed or not. If not, then the frames are added to a first set of 2D frames at block 416. If yes, then the 2D frames are added to the second set of 2D frames at block 414.

Therefore, the detection module 212 segregates the plurality of 2D frames into the first set of 2D frames and the second set of 2D frames based upon the detection of the camera motion in the each frame. It may be understood that the first set of 2D frames is detected to be void of the camera motion, whereas the second set of 2D frames is detected to have the camera motion therein. After segregating the 2D frames into the first set of 2D frames and the second set of 2D frames, the second set of 2D frames is discarded by the detection module 212 as the second set of 2D frames contained 2D frames with disturbance or camera motion.

Subsequently, the first set of 2D frames is processed by the cloud point module 214. The cloud point module 214 is configured to determine a plurality of cloud points in each 2D frame of the first set of 2D frames. Each cloud point of the plurality of cloud points stores the x, y, z co-ordinates and color data associated with each pixel of each 2D frame of the first set of 2D frames. The cloud point module 214 generates a cloud point (Vc) corresponding to each pixel in each 2D frame from the first set of 2D frames. Each of the cloud point (Vc) stores color data such, as RGB/G data and the depth data associated with the corresponding pixel in the frame. The cloud point is represented as Vc={r, g, b, x, y, z}, wherein the r, g and b are the color coordinates corresponding to the pixel. Further the x, y and z represent the three dimensional coordinates corresponding to the pixel.

Subsequent to cloud point generation/determination on each 2D frame of the first set of 2D frames, the voxelization module 216 receives the 2D frames with cloud points.

Figure 5:
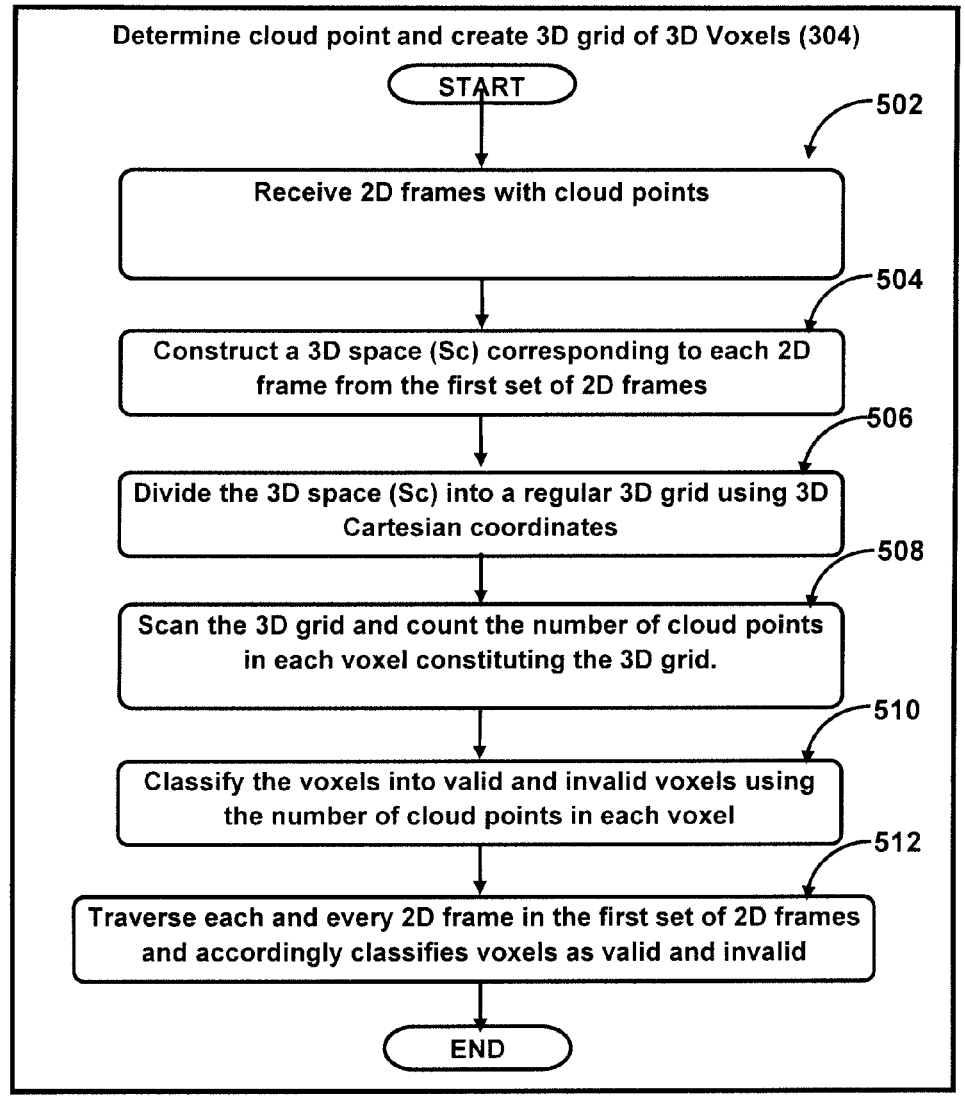
FIG. 5 is a flowchart illustrating a method for voxelization of 2D frames of the 2D video and the depth data, in accordance with an embodiment of the present subject matter.

Referring now to FIG. 5, a flowchart illustrating a voxelization process for each 2D frame of the first set of 2D frames is shown, in accordance with an embodiment of the present subject matter. It may be understood that the voxelization process reduces noise in each 2D frame of the first set of 2D frames. The noise may be in the form of a plurality of misplaced cloud points. The misplaced cloud points need to be removed before labeling the objects in the 2D frames.

At block 502, the voxelization module 216 receives the 2D frames having cloud points. At block 504, the voxelization module 216 constructs the 3D space (Sc) corresponding to each 2D frame from the first set of 2D frames. The 3D space (Sc) represents a virtual landscape for further processing and segmentation of the 2D frames.

Figure 7:
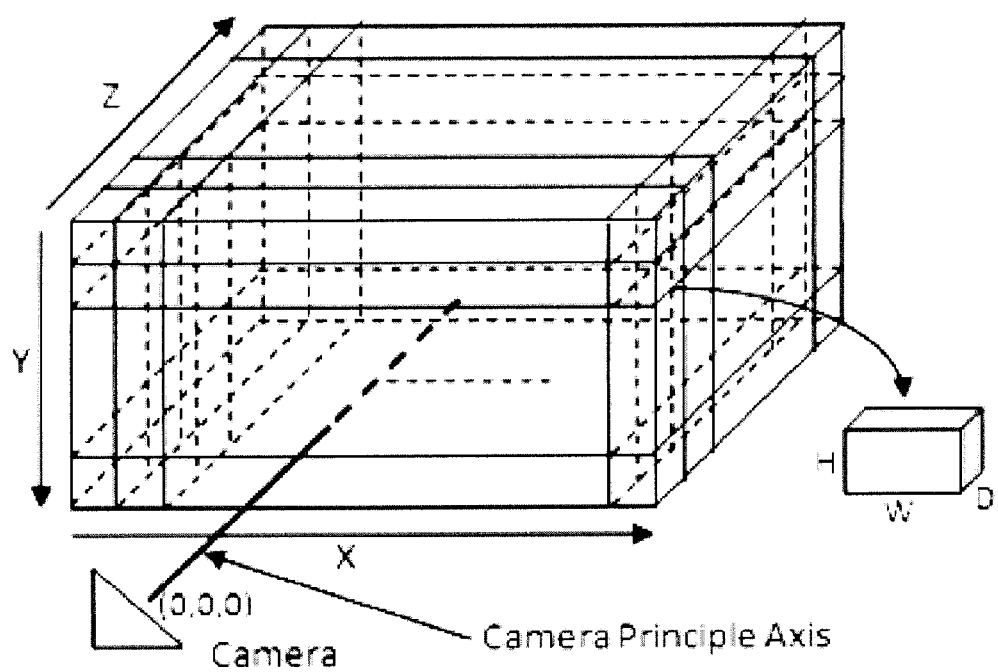
FIG. 7 depicts 3D grids constructed to each 2D frame from a first set of 2D frames and depth data.

At block 506, the 3D space (Sc) is divided into a plurality of voxels together constituting the 3D grid. The voxelization module 216 uses the 3D Cartesian coordinate system to divide the 3D space (Sc) into voxels. Each of the voxel has an equal height h, a width w and a depth d respectively. The 3D grid is generated by dividing the 3D space using a plurality of equidistant planes perpendicular to an x-axis, a y-axis and a z-axis. Each voxel in the 3D grid represents a vertex (Vc) with a definite volume with 3D dimensions as specified in grid dimensions stored in the system database 224. It may be understood that each voxel is surrounded by three pairs of consecutive equidistant planes along the x-axis, y-axis and z-axis. In a similar manner FIG. 7 depicts the 3D grids constructed corresponding to each 2D frame from the first set of 2D frames and the depth data.

At block 508, the number of cloud points in each voxel constituting the 3D grid is computed by the voxelization module 216. The number of cloud points in each voxel is represented as (Ni).

At block 510, the voxels corresponding to each 2D frame are classified into a valid and an invalid voxel. For this purpose, the number of cloud points in each voxel Ni is compared with the cloud point threshold stored in the system database 224. If the number of cloud points Ni in the $i^{th}$ voxel is less than the cloud point threshold, then the voxel is classified as invalid voxel and assigned a value as zero. In case, a number of the cloud points in the voxel are greater than the cloud point threshold, the voxel is treated as the valid voxel. In a similar manner, all the voxels in the 3D grid are classified as valid voxels and invalid voxels.

At block 512, each and every 2D frame in the first set of 2D frames is traversed and accordingly the voxels associated thereof are classified as valid voxels and invalid voxels. All the valid voxels are clubbed together as a set of valid voxels. Further, all the invalid voxels are clubbed together as a set of invalid voxels. For the 2D frames having valid voxels, objects or 3D connected component are labeled to segment the same.

Figure 6:
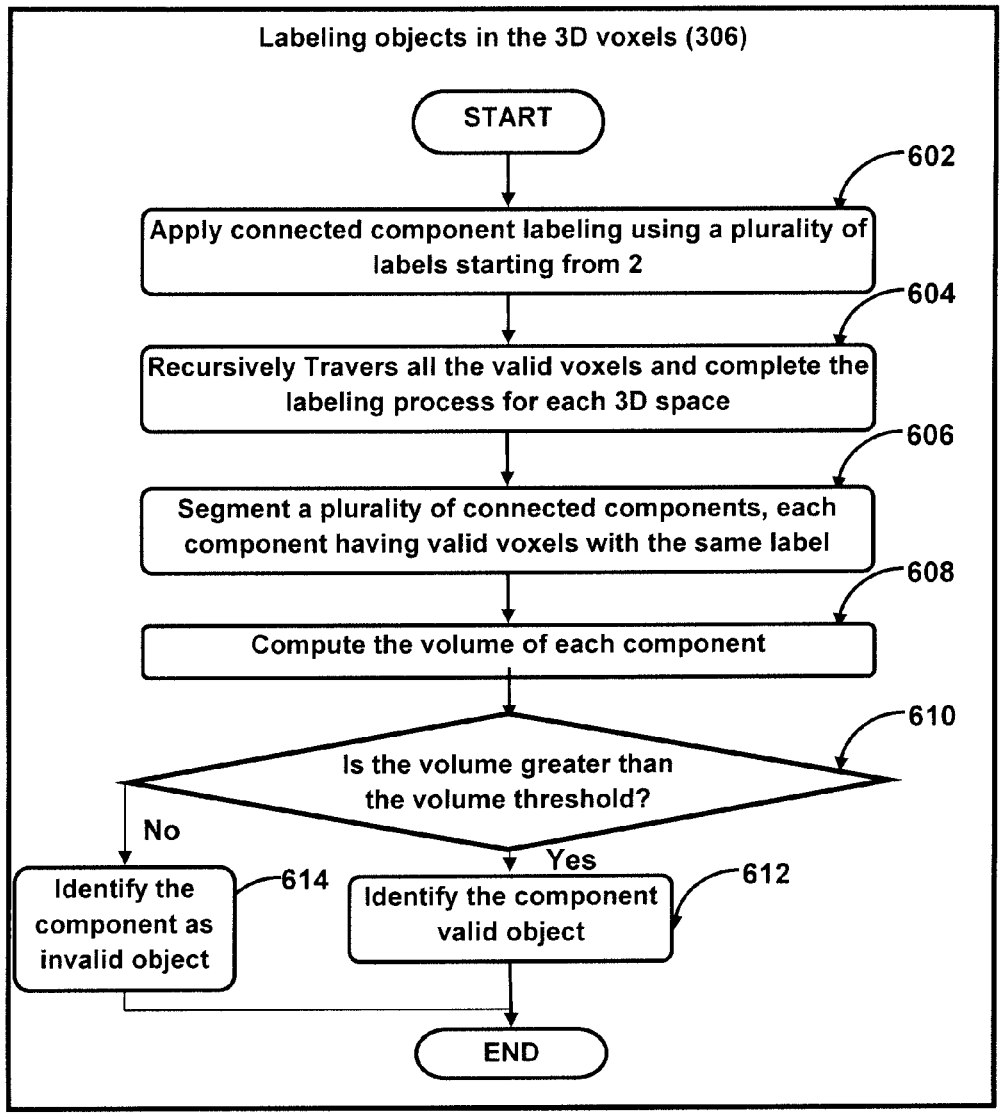
FIG. 6 is a flowchart illustrating a method for labeling each voxel, in accordance with an embodiment of the present subject matter.

Referring now to FIG. 6, a flowchart for applying a 3D connected component labeling on the set of valid voxels is shown, in accordance with an embodiment of the present subject matter. It may be understood that all objects or connected components are labeled using a 3D connected component labeling technique to segment the valid voxels into individual objects/components using a plurality of labels being used for labeling.

At block 602, the set of valid voxels corresponding to certain 2D frames from the first set of 2D frames is taken as input by the voxel labeling module 218. In the next step, a plurality of labels starting from label number 2 is considered for applying 3D connected component labeling. It may be understood that the valid voxels are labeled as 1 and the invalid voxels are labeled as 0, therefore, for the purpose of the present subject matter, the components/objects are labeled starting from 2. In one example, a random voxel from the set of valid voxels is considered as a starting point for labeling. The 3D connected component labeling technique is applied by the voxel labeling module 218 on 26 neighboring voxels of the random voxel. The 3D connected component labeling process is continued until all the valid voxels are traversed and labeled. It may be understood that a new label is introduced whenever an unconnected voxel is to be labeled in the 3D connected component labeling process.

At block 604, all the valid voxels are recursively traversed in order to resolve ambiguity between labels and accordingly the 3D connected component labeling process is completed for the set of valid voxel associated therewith each 2D frame to generate a cluster of connected components. In a similar manner, the 3D connected component labeling is applied on the valid voxels of each and every 2D frame from the first set of 2D frames, to generate the corresponding cluster of connected components.

At block 606, a segmentation process is initiated by the voxel labeling module 218 on the cluster of connected components in order to segment a plurality of connected components, wherein each component is indicative of the group of valid voxels with the same label.

At block 608, the voxel labeling module 218 computes a volume of each component by sequentially summing the number of voxels constituting each of the components.

At block 610, the voxel labeling module 218 compares the volume of each component to the volume threshold stored in the system database 224.

At block 612 and block 614, if the volume of the component is more than the volume threshold, the component is considered as a valid object or else the component is considered as an invalid object. In a similar manner all the components from each of the 3D space (Sc) corresponding to each first set of 2D frames is classified into valid and invalid objects.

It may be understood that the present subject matter enables faster and clearer segmentation of overlapping components/objects in the 2D video along with the depth data. The present subject matter enables discarding certain frames having disturbances/camera motion there within to improve quality of object detection in the 2D frames and depth data of the 2D video. The present subject matter further enables use of temporal characteristics such as, color data and depth data over a sequence of 2D frames to segment overlapping components. The present subject matter further, enables in reducing the noise component in each of the 2D frames by using the voxelization threshold to discard a set of invalid voxels having noise/disturbance. Furthermore, the present subject matter enables faster voxelization of a 3D space and applying 3D connected component labeling to accurately identify connected components/objects over a sequence of 2D frames and depth data.

We claim:

1. A method for segmenting a plurality of objects present in a two-dimensional (2D) video having a plurality of 2D frames and depth information, the method comprising:

receiving, by a processor, the 2D video and the depth information corresponding to pixels of the 2D frames in the 2D video;

detecting, by the processor, camera motion in each 2D frame of the plurality of 2D frames of the 2D video;

segregating, by the processor, the plurality of 2D frames into a first set of 2D frames and a second set of 2D frames based upon the detection of the camera motion in the each frame, wherein the first set of 2D frames is detected to be void of the camera motion, and wherein the second set of 2D frames is detected to have the camera motion therein;

determining, by the processor, a plurality of cloud points in each 2D frame of the first set of 2D frames and depth data, wherein each cloud point of the plurality of cloud points stores x, y, z co-ordinates data and color data associated with each pixel of each 2D frame of the first set of 2D frames;

converting, by the processor, each 2D frame and depth data of the first set of 2D frames into a 3D grid, wherein the 3D grid comprises a plurality of voxels, and wherein the 3D grid is indicative of a division of a 3D space, associated with each frame, by a plurality of equidistant planes perpendicular to an x-axis, a y-axis and a z-axis, and wherein each voxel has a definite volume in the 3D grid, and wherein each voxel accommodates one or more cloud points, and wherein each voxel being indicative of the definite volume is surrounded by three pairs of consecutive planes along the x-axis, the y-axis and the z-axis;

determining, by the processor, valid voxels and invalid voxels from the plurality of voxels based upon a number of cloud points present in each voxel of the plurality of voxels;

classifying, by the processor, each voxel of the plurality of the voxels into a first set of voxels and a second set of voxels after traversing each 2D frame of the plurality of the 2D frames in the first set of 2D frames, wherein the first set of voxels are valid voxels, and wherein the second set of voxels are invalid voxels; and labeling, by the processor, each voxel in the first set of voxels using a 3D connected component labeling technique in order to segment the plurality of objects present in the 2D video and depth data.

2. The method of claim 1, wherein the camera motion is detected by monitoring a change in color data of each 2D frame of the plurality of 2D frames.

3. The method of claim 1, wherein each cloud point is representative of a pixel in a frame.

4. The method of claim 1, wherein the 3D grid is generated along the x-axis, the y-axis, and the z-axis.

5. The method of claim 1, wherein the camera motion comprises a camera jitter, a change in camera direction, illumination changes in a surrounding environment, or any combination thereof.

6. The method of claim 1, wherein the valid voxels and the invalid voxels are determined based upon the number of cloud points associated with each voxel of the plurality of voxels in the 3D grid.

7. A segmentation system for segmenting a plurality of objects present in a two-dimensional (2D) video having a plurality of 2D frames and depth information, the system comprising:
    a processor; and
    a memory coupled to the processor, wherein the processor is capable of executing a plurality of modules stored in the memory, and wherein the plurality of module comprising:
        a detection module configured to
            receive the 2D video and the depth information corresponding to pixels of the 2D frames in the 2D video;
            detect camera motion in each 2D frame of the plurality of 2D frames of the 2D video;
            segregate the plurality of 2D frames into a first set of 2D frames and a second set of 2D frames based upon the detection of the camera motion in the each frame, wherein the first set of 2D frames is detected to be void of the camera motion, and wherein the second set of 2D frames is detected to have the camera motion therein;
        a cloud point module configured to
            a cloud point module configured to determine a plurality of cloud points corresponding to each 2D frame of the first set of 2D frames, wherein each cloud point of the plurality of cloud points stores x, y, z co-ordinates and color data associated with each pixel of each 2D frame of the first set of 2D frames;
        a voxelization module configured to
            convert each 2D frame using corresponding depth information of the first set of 2D frames into a 3D grid, wherein the 3D grid comprises a plurality of voxels, and wherein each voxel accommodates one or more cloud points;
            determine valid voxels and invalid voxels from the plurality of voxels based upon a number of cloud points present in each voxel of the plurality of voxels;
            classify each voxel of the plurality of the voxels into a first set of voxels and a second set of voxels after traversing each 2D frame of the plurality of the 2D frames in the first set of 2D frames, wherein the first set of voxels are valid voxels, and wherein the second set of voxels are invalid voxels; and
        a voxel labeling module configured to
            a voxel labeling module configured to label each voxel in the first set of voxels using a 3D connected component labeling technique in order to segment the plurality of objects present in the 2D video and associated depth information.

8. The segmentation system of claim 7, wherein the 3D grid is indicative of a division of a 3D space by a plurality of equidistant planes perpendicular to an x-axis, a y-axis and a z-axis, and wherein each voxel has a definite volume in the 3D grid, and wherein each voxel being indicative of the definite volume is surrounded by three pairs of consecutive planes along the x-axis, the y-axis and the z-axis.

9. The segmentation system of claim 7, wherein the camera motion is detected by monitoring a change in color data of each 2D frame of the plurality of 2D frames.

10. The segmentation system of claim 7, wherein each cloud point is representative of a smallest entity in 3D space, and wherein each cloud point is equivalent to a pixel in the 2D frame.

11. The segmentation system of claim 8, wherein the 3D grid is generated along the x-axis, the y-axis, and the z-axis.

12. The segmentation system of claim 7, wherein the camera motion comprises a camera jitter, a change in camera direction, illumination changes in a surrounding environment, or any combination thereof.

13. The segmentation system of claim 7, wherein the valid voxels and the invalid voxels are determined based upon the number of cloud points in each voxel of the plurality of voxels in the 3D grid.

* * * * *